Nov. 19, 1968   CARL-ERIK GRANQVIST   3,412,329
FREQUENCY METER

Filed April 1, 1966   2 Sheets-Sheet 1

INVENTOR

CARL-ERIK GRANQVIST

BY Larson and Taylor

ATTORNEYS

Nov. 19, 1968    CARL-ERIK GRANQVIST    3,412,329
FREQUENCY METER

Filed April 1, 1966    2 Sheets-Sheet 2

INVENTOR
CARL-ERIK GRANQVIST

BY Larson and Taylor

ATTORNEYS

United States Patent Office 3,412,329
Patented Nov. 19, 1968

3,412,329
FREQUENCY METER
Carl-Erik Granqvist, Lidingo, Sweden, assignor to
AGA Aktiebolag
Filed Apr. 1, 1966, Ser. No. 539,497
Claims priority, application Sweden, Apr. 9, 1965,
4,608/65
6 Claims. (Cl. 324—79)

The present invention relates to an arrangement for measuring the frequency of a pulsating voltage, more particularly to such an arrangement wherein the frequency is divided by means of an electronic counter and the output signal from the counter is compared in a frequency detector with a reference frequency. The expression "pulsating voltage" includes both a real alternating voltage and a series of pulses having a certain frequency, which series of pulses can be regarded as an alternating voltage superimposed upon a D.C. voltage.

It is known to use an electronic counter for the measuring of the frequency of a pulsating voltage. During a certain time interval the number of incoming pulses of the pulsating voltage are counted after the counter has been returned to zero during a preceding time interval. The counter thus indicates the number of pulses counted. This method requires that the counting occurs during one time period and the resetting of the counter to zero takes place during a succeeding time period. As a result, the time required to make a measurement becomes rather long. Another drawback is that a slight change in the frequency will not be indicated until a counting has been completed. When such a counter is used to control a servo arrangement the speed of the measurement often is not great enough. Further, it may be difficult to derive the differential or rate of change of changes in the frequency.

It is, therefore, the principal object of the present invention to provide a novel and improved arrangement for measuring the frequency of a pulsating voltage.

It is a further object of the present invention to provide an arrangement for quickly and precisely determining the frequency of a pulsating voltage at any time.

These objects are achieved and the above-mentioned difficulties are obviated by the arrangement of the present invention. This arrangement essentially comprises connecting the output circuit of a frequency detector to a forward and backward counter which is connected over a coincidence circuit to a dividing counter for controlling the time required for feeding a predetermined number of periods of the measured pulsating voltage in such a way that the frequency of the series of pulses delivered from this counter becomes equal to the reference frequency. The setting of the forward and backward counter is thus used to indicate the frequency of the measured pulsating voltage. Preferably, the frequency detector is provided with two output circuits, each of which is connected to the forward and backward counter over an AND-circuit. The reference frequency and the series of pulses from the dividing counter, respectively, are supplied to each of these AND-circuits.

Other objects and advantages of the present invention will be apparent from the accompanying description when taken in conjunction with the following drawings, wherein.

Figure 1:
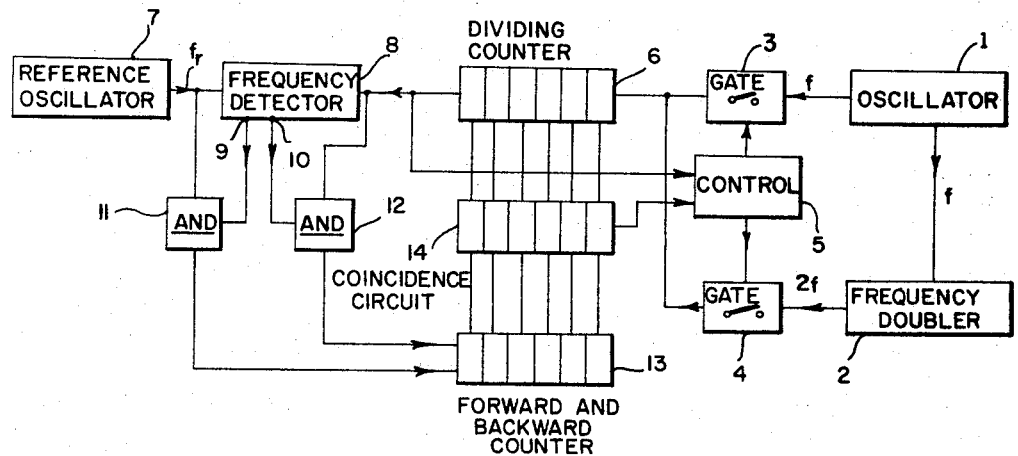
FIGURE 1 is a block diagram showing schematically the arrangement of the present invention.

In the present invention as shown in FIG. 1 the pulsating voltage, the frequency of which shall be determined, is generated in an oscillator 1. This oscillator is connected to a frequency doubler 2 to a gate circuit 3. The frequency doubler 2 is connected to a second gate circuit 4 and these two gate circuits are controlled in a manner described below by a control means 5 in such a manner that only one of the gate circuits 3 and 4 is open. The output circuits from the gate circuits 3 and 4 are joined and connected to a dividing electronic counter 6 which comprises a number of frequency halving steps. This number is so chosen that a pulse frequency of the same order as a reference frequency generated in a reference oscillator 7 is obtained at the output circuit of the electronic counter 6. Both the counter 6 and the reference oscillator 7 feed an input circuit of a frequency detector 8 which is of the type having two stable positions. The detector 8 has two output circuits 9 and 10 so selected that a positive potential appears at either of these output circuits dependent upon the momentary position of the frequency detector.

Each of the output circuits 9 and 10 is connected to a AND-circuit 11 and 12, respectively. Each AND-circuit is also provided with a second input circuit to which is applied the reference frequency from the reference oscillator 7 and the divided frequency from the counter 6, respectively. The output circuits from the two AND-circuits are connected to a forward and backward counter 13 in such a way that pulses applied from the first AND-circuit 11 drive the counter 13 in one direction, and pulses from the second AND-circuit 12 drive the counter 13 in the opposite direction. This forward and backward counter 13 is connected over a coincidence circuit 14 to the dividing counter 6. This coincidence circuit 14 is also connected to actuate the control means 5 for switching from one of the gate circuits 3 and 4 to the other one. The control means 5 is also connected to be controlled by a pulse delivered from the counter 6 when a predetermined number of pulses have been counted by this counter.

The arrangement according to FIG. 1 as described above functions in the following manner:

The pulsating voltage from the oscillator 1 has the frequency $f$; accordingly, the frequency from the frequency doubler 2 will be $2f$. It is also assumed that the dividing counter 6 has a total capacity equal to $2n_0$ and that a switching from the gate circuit 3 to the gate circuit 4 takes place when the number of pulses having the frequency $f$ applied to the counter 6 is $2n$. At that time the counter 6 is fed with a series of pulses having the frequency $2f$ until the total number of pulses $2n_0$ have been fed into the counter. The number of pulses $2n$ of the frequency $f$ which in this way are applied to the counter 6 before a switching between the gate circuits 3 and 4 takes place is controlled in a manner described below by the forward and backward counter 13 over the coincidence circuit 14.

The time required for feeding the total number of pulses $2n_0$ to the counter 6 becomes $$t = \frac{2n}{f} + \frac{2n_0 - 2n}{2f} = \frac{4n + 2n_0 - 2n}{2f} = \frac{n_0 + n}{f}$$

From this it is obvious that the frequency of the series $$\frac{f}{n_0 + n}$$

of pulses delivered from the dividing counter 6 becomes This series of pulses is applied to the frequency detector 8, in which it is compared with the reference frequency of the pulsating voltage generated in the reference oscillator 7. If the frequency of the series of pulses delivered from the dividing counter 6 differs from the reference frequency, which is designated $f_r$, output pulses are generated in either of the AND-circuits 11 and 12 as follows. The pulses of the series of pulses delivered from the dividing counter 6 switch the frequency detector 8 from a first stable position to a second stable position and the pulses of the reference frequency switch the frequency detector from said second stable position to said first stable position. In this way output pulses are obtained from the output circuits 9 and 10 alternatively. Under the assumption that said two frequencies are exactly alike, none of the AND-circuits 11 and 12 will transfer those pulses which are supplied from the counter 6 and from the reference oscillator 7, respectively. If, however, the frequency $f_r$ is greater than $$\frac{f}{n_o+n}$$

a number of succeeding pulses from the reference oscillator 7 will be supplied to the AND-circuit 11 before the frequency detector 8 switches over to another stable position. As a result, the pulses are delivered from the output circuit of the AND-circuit 11. In an analogous way pulses are delivered from the output circuit of the AND-circuit 12 under the assumption that $f_r$ is smaller than $$\frac{f}{n_o+n}$$

The forward and backward counter 13 will thereby be set on a position corresponding to $f=f_r(n_o+n)$. From this equation it is obvious that the position which the counter 13 assumes and the frequency of the pulsating voltage from the reference oscillator 7 can be used for achieving a measure of the frequency $f$ of the unknown pulsating voltage. In this connection it is pointed out that if the frequency difference between the pulse frequencies supplied to the frequency detector 8 is great, the forward and backward counter 13 will be driven at a high speed which then decreases when the frequency difference becomes smaller. In this way a good stability of the arrangement is achieved.

By way of example it may be assumed that the reference frequency is 100 c.p.s. and that the dividing counter 6 comprises ten frequency halving steps. This means that the frequency of the oscillator 1 can be digitally measured between the frequencies 102,400 and 204,800 c.p.s. This can also be expressed in the following way: Under the assumption that the frequency difference is small, the arrangement is able to test 100 times per second the correctness of the setting of the counter 6.

Figure 2:
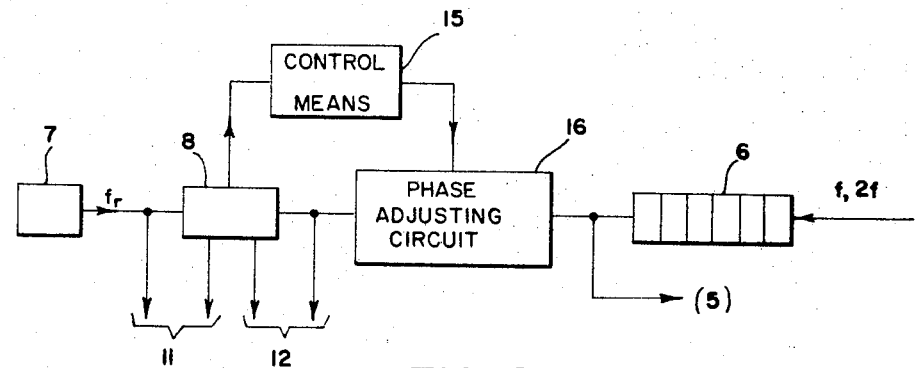
FIGURE 2 is a block diagram showing schematically a modification to the arrangement of FIGURE 1 wherein a phase adjusting circuit is connected between the dividing counter and the frequency detector.

The output voltage from the frequency detector 8 will have an unsymmetrical form so that the time duration of each delivered positive pulse is dependent on the mutual phase position between the pulsating voltage from the counter 6 and the pulsating voltage from the reference oscillator 7. As a result, if this time duration is very short or is close to the duration of one full period, then even the smallest periodic frequency variation will result in a forward and backward resetting of the smallest unity of the counter 6. This can be obviated, as shown in FIG. 2, by connecting a phase adjusting circuit 16 between the counter 6 and the frequency detector 8. The phase adjusting circuit 16 is controlled by an output voltage from a control means 15. The control means 15 rectifies and inverts the output signal from the phase detector 8. As a result, the time duration of each positive pulse from the frequency detector 8 can be given a suitable length so that a slight periodic frequency variation will not cause a periodic forward and backward resetting of the counter 6.

Figure 3:
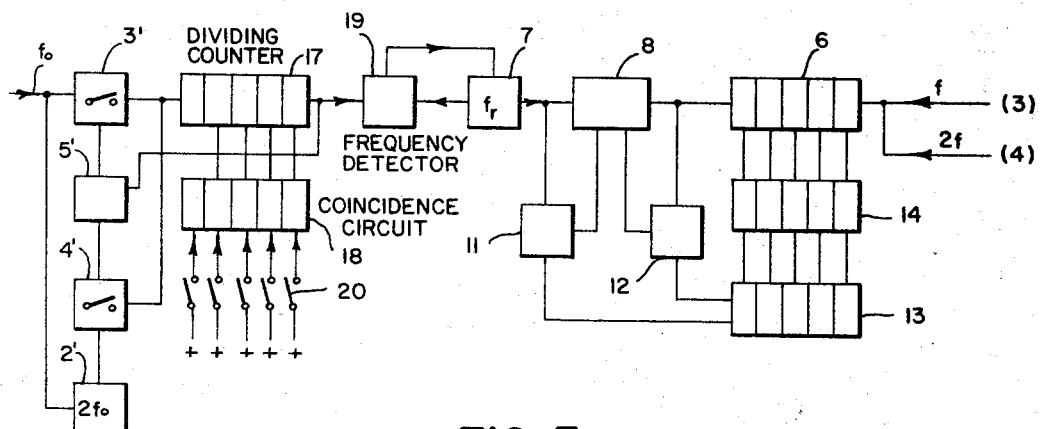
FIGURE 3 is a block diagram showing schematically an arrangement which can be connected to the arrangement of FIGURE 1 to divide the binary digits representing the frequency.

Proceeding next to FIG. 3, there is shown an arrangement in which it is possible to divide the binary digits representing the frequency. In addition to the elements shown in FIG. 1 the arrangement of FIG. 3 also comprises a further counter 17 and a further coincidence circuit 18. This counter 17 is controlled by the circuit 18. This counter 17 is controlled by the circuit 18 in such a way that the frequency $f_o$ of a pulsating voltage supplied to the counter 17 is divided in the counter 17 whereupon the output signal from this counter is supplied to a further frequency detector 19 to which also is supplied the reference frequency generated in the reference oscillator 7. Thus, the output from the further frequency detector 19 controls the reference oscillator 7. The coincidence 18 is set in a manner well known in the art by applying positive potentials over the switches 20 to a predetermined combination of stages of the coincidence circuit. The following relation between the frequencies $f_o$ and $f_r$ is then obtained:

$$f_o=f_r(n_o'+n')$$

It is thus apparent that $2n_o'$ indicates the total capacity of the counter 17 and $2n'$ indicates the number of pulses of the frequency $f_o$ supplied to the counter 17. It is furthermore assumed that the coincidence circuit 18 causes a switching from the frequency $f_o$ to the frequency $2f_o$ by means of elements 3', 4' and 5' in the same way as the corresponding shift between the frequencies $f$ and $2f$ in the arrangement according to FIG. 1.

The following relation between the frequencies $f$ and $f_o$ supplied to the arrangement according to FIG. 3 is thus derived:

$$f=\frac{f_o}{n_o'+n'}(n_o+n) \qquad (4)$$

By a suitable frequency division of the reference frequency $f_r$ and by comparing the resulting pulse frequency in a frequency detector corresponding to the frequency detector 19 with a supplied frequency $f_o$ the following relation between the frequencies $f$ and $f_o$ supplied to the arrangement is obtained $$f=f_o(n_1'+n')(n_o+n) \qquad (5)$$

Figure 4:
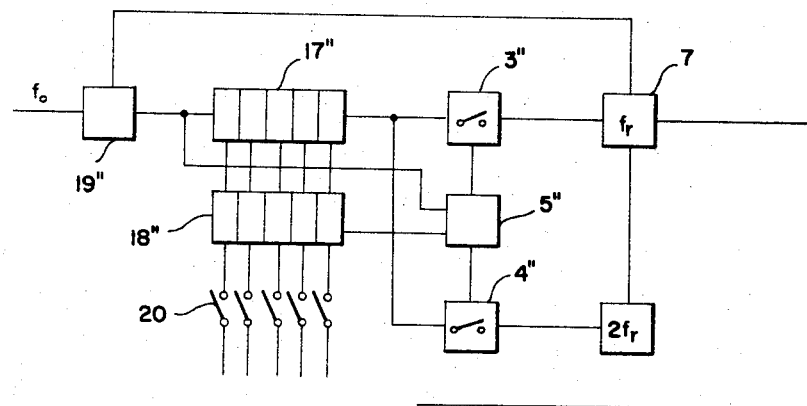
FIGURE 4 is a block diagram showing schematically a modification of the present invention for frequency division of the reference frequency.
Figure 4:
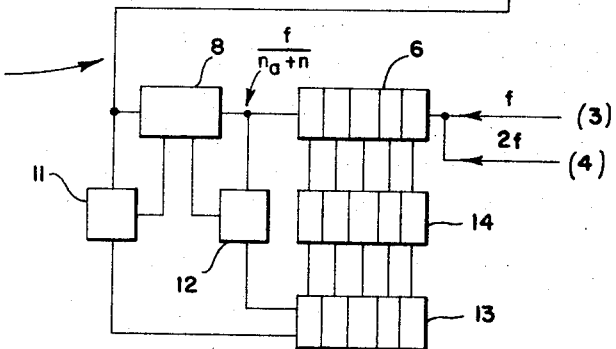

An arrangement for achieving this result is shown in FIG. 4. It is seen from this figure that the frequency $f_o$ is supplied to a frequency detector 19'' to which also is applied the demultiplied frequency generated in the reference oscillator 7 and divided in the counter 17''. To the counter 17'' are supplied the frequencies $f_r$ and $2f_r$ over the gate circuits 3'' and 4'' which are controlled by the control means 5'' by an output pulse from the coincidence circuit 18''. This coincidence circuit 18'' is set in a manner well known in the art by applying, for example, positive potentials over the switches 20 to a predetermined combination of the stages of the coincidence circuit 18''. In this way a number of pulses having the frequency $f_r$ equal to $2n'$ supplied to the counter 17'' before a switching to the frequency $2f_r$ takes place. This gives the following relation between the frequencies $f_r$ and $f_o$ $$f_r=f_o(n_o'+n') \qquad (6)$$

The frequency $f_r$ is supplied to the frequency detector 8 as in the arrangement according to FIG. 1 from which follows the relation between the frequencies $f$ and $f_o$ given in the Equation 5.

As many variations may be made without departing from the spirit and scope of the invention it is to be understood that the invention is no way limited by the above description or specific examples except as set forth in the appended claims.

What is claimed is:

1. An arrangement for measuring the frequency of a pulsating voltage, and comprising a frequency dividing counter connected to a source of pulsating voltage and producing an output signal, a frequency detector connected to the output of said dividing counter to receive the output therefrom and connected to a reference frequency source, said frequency detector having two output circuits with output pulses being produced in either of said two output circuits when said reference frequency differs from the frequency of the output signal of said dividing counter, a forward and backward counter having an input circuit connected to said detector output circuits, a coincidence circuit connecting said forward and backward counter with said dividing counter and having an output, said coincidence circuit producing an output pulse when a predetermined number of pulses of the frequency of the pulsating voltage have been supplied to said dividing counter, control means connected to said output of said coincidence circuit and said dividing counter, means connected to said control means and said dividing counter output for producing pulses of a second frequency having a fixed relation to the frequency of said source of pulsating voltage, said control means being triggered by said output pulse of said coincidence circuit to supply to said dividing counter a number of further pulses of said second frequency up to the full capacity of said dividing counter when an output pulse is produced by said dividing counter, the setting of said forward and backward counter being responsive to the difference between the frequencies supplied to said frequency detector whereby said setting is an indication of the frequency of said pulsating voltage.

2. An arrangement as claimed in claim 1 wherein said control means comprises a first electronic gate connected to said source of pulsating voltage and to said frequency dividing counter, a second electronic gate connected to said means for supplying pulses of a second frequency and said dividing counter output, and a control member connected between said gates and to the output of said coincidence circuit for making either of said gates conductive.

3. An arrangement as claimed in claim 1 and further comprising AND-circuits connected between said frequency detector outputs and the input circuit of said forward and backward counter, one AND-circuit being further connected to said reference frequency source and the other AND-circuit to the output of said dividing counter.

4. An arrangement as claimed in claim 1 wherein said means for producing a second frequency is also connected to said source of pulsating voltage and doubles the frequency of said pulsating voltage.

5. An arrangement as claimed in claim 1 and further comprising a phase adjusting circuit connected between the output of said dividing counter and the input of said frequency detector, said phase adjusting circuit being responsive to a signal from said frequency detector to adjust the mutual phase position between the reference frequency and the dividing counter output signal.

6. An arrangement as claimed in claim 1 and further comprising a source of pulsating voltage at a third frequency connected to said reference voltage source, and means interconnecting said two voltage sources for transforming one of said frequencies to a proportional relationship to the other of said frequencies.

No references cited.

RUDOLPH V. ROLINEC, *Primary Examiner.*

P. F. WILLE, *Assistant Examiner.*